July 16, 1963

A. R. DEEDMAN 3,097,573

ACTUATOR FOR CONVERTING STRAIGHT-LINE MOVEMENT TO OSCILLATORY MOTION AND VICE VERSA

Filed May 5, 1961

INVENTOR.
ALFRED R. DEEDMAN
BY
*Milburn & Milburn*
ATTORNEYS

United States Patent Office 3,097,573
Patented July 16, 1963

3,097,573
ACTUATOR FOR CONVERTING STRAIGHT-LINE MOVEMENT TO OSCILLATORY MOTION AND VICE VERSA
Alfred R. Deedman, 6092 Fulton Drive NW., Canton, Ohio
Filed May 5, 1961, Ser. No. 108,121
4 Claims. (Cl. 92—68)

The present invention relates to the class of devices that are adapted for converting straight-line movement either to or from oscillatory motion and is an improvement upon that disclosed in the U.S. Letters Patent to Steiner, No. 2,844,127, July 22, 1958.

While the present invention is capable of being utilized for the conversion of straight-line movement to oscillatory motion or vice versa, I will herein explain the structure and refer to its various possible uses in connection with the conversion of the straight-line movement of a fluid-operated piston means to the oscillatory motion of an out-put spindle or shaft which is adapted for operative connection to an instrument. For instance, my present form of device is well adapted for effecting the oscillatory opening and closing movements of rotatably mounted valves in the submarine and shipbuilding industry and various phases of the modern-day space and missile program. This invention may be used also in the application of oscillatory shaft motion in connection with tooling and indexing devices, roll jigs, printing presses, die clamps and lift transfer devices.

The object of this invention is to provide a comparatively simple and inexpensive form of such device that is capable of performing its intended function in a positive and dependable manner.

A further object is to devise such an actuator that is subject to comparatively little friction and wear between the operating parts and hence is capable of comparatively long life of usefulness.

Other objects will appear from the following description and claims when considered together with the accompanying drawing.

Figure 1:
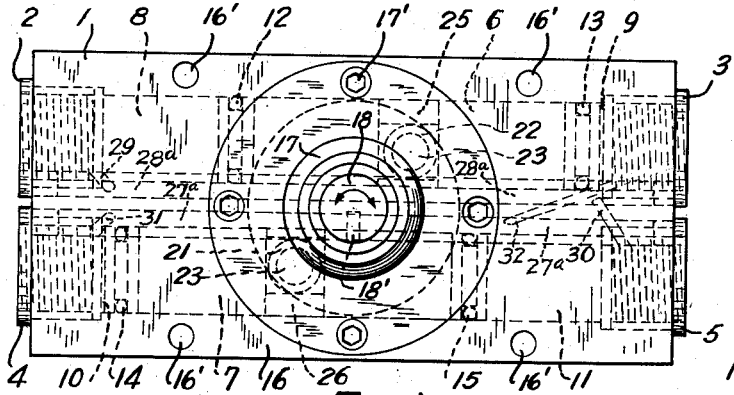
Figure 3:
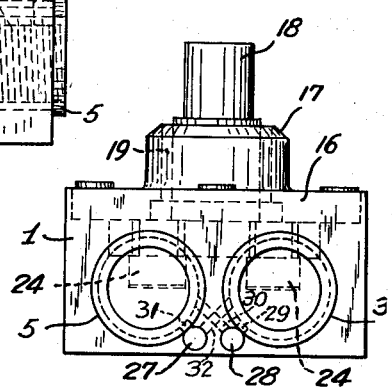
Figure 2:
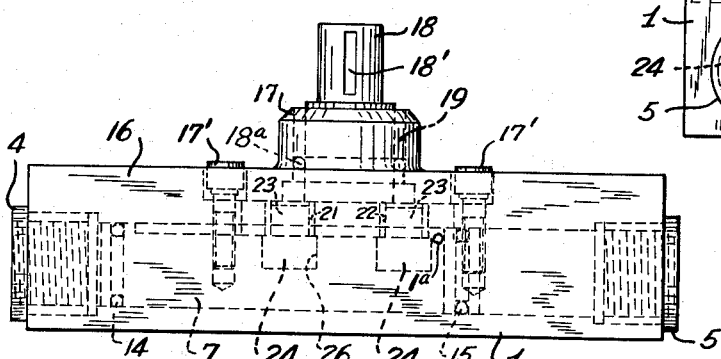
Figure 4:
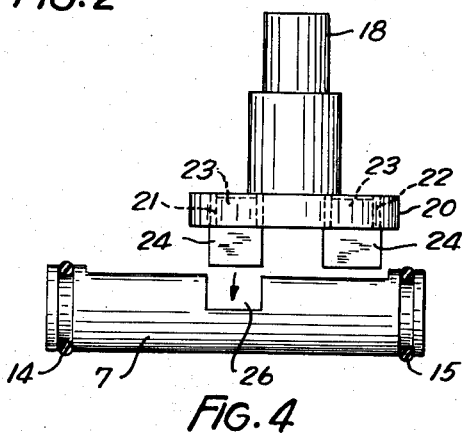
Figure 5:
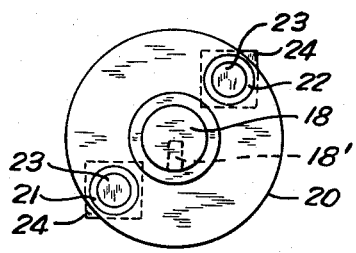

FIG. 1 is a top plan view of my present form of device;
FIG. 2 is a side elevation thereof;
FIG. 3 is an end elevation thereof;
FIG. 4 is a distended view illustrating the relationship between the pawl mechanism and the pistons;
FIG. 5 is a plan view of the spindle and pawls.

Referring now to the accompanying drawing in detail, the body 1 is provided with two parallel duplicate cylindrical openings therethrough, which are closed at their ends by the screw-threaded heads 2, 3, 4 and 5. Within these openings are the reciprocatable duplicate pistons 6 and 7 which divide the cylindrical openings into the end chambers 8 and 9, 10 and 11; and each of the pistons is provided at its two ends with suitable grooves for the familiar sealing rubber O rings 12, 13, 14 and 15.

The body 1 has a top closure plate 16 that is held in place by the screws 16'; and in the middle of this plate there is secured the locating cap 17 by means of equally spaced screws 17'. The spindle 18, with its key-way 18' for operative connection of an instrument thereto, extends co-axially through the cap 17, with the bronze bushing 19, and has its inner end in the form of a circular disk 20 with the two diametrically located openings 21 and 22 therethrough near the circumference thereof. These openings 21 and 22 have engaged therein the oscillatable shank portions 23 of the duplicate driving pawls which have their other ends of rectangular form, as at 24, for operative engagement in the correspondingly formed duplicate recesses 25 and 26 in the same plane in the tops and midway of the length of the pistons 6 and 7, respectively. The disk 20 occupies a plane normal to the axis of the spindle 18 and parallel to the plane of recesses 25 and 26; and the pawls extend at right angles to disk 20. The pawl end of the spindle is enclosed entirely within the body 1.

The interior of this device is packed with a suitable lubricating compound through a conventional fitting 1a but the sealing rings 12, 13, 14 and 15 will seal the chambers 8, 9, 10 and 11 at the ends of the cylinders; and a sealing ring 18a may be provided for projecting end portion of the spindle 18.

The two screw-threaded openings 27 and 28 are provided in one end of body 1 for attachment of suitable fluid pressure and exhaust means for effecting straight-line movement of the pistons 6 and 7. The opening 28 has direct connection through passages 28a and 29 with chamber 8 at the one end of piston 6 and direct connection through passages 28a and 30 with chamber 11 at the opposite end of piston 7; while the opening 27 has direct connections through passages 27a—31 and 27a—32 with the chamber 10 at one end of piston 7 and with the chamber 9 at the opposite end of piston 6, respectively. The outer ends of the angularly drilled passages will of course be plugged closed. It is to be understood that the fluid pressure and exhaust means for the openings 27 and 28 will be provided with suitable means of valve control for alternately connecting the chambers 8 and 11 and the chambers 9 and 10, in such pairs, to the pressure line and exhaust line, respectively, so as to thereby effect reciprocating movement of the pistons 6 and 7 in opposite directions. That is, when fluid pressure is applied to the chambers 8 and 11, the chambers 9 and 10 will be connected to the exhaust; and when pressure is applied to the chambers 9 and 10, the chambers 8 and 11 will be connected to the exhaust; and these connections will be alternated. Such reciprocating movement of the pistons will, through engagement of the pawls 24 in their recesses 25 and 26, effect oscillatory motion of the disk 20 and its spindle 18. As will be observed, the transverse extent of the recesses 25 and 26 is sufficiently greater than that of the rectangular portions 24 to accommodate the combined revolving and straight-line movement of the pawls.

Thus the reciprocatory movement of the pistons 6 and 7 by the application of fluid pressure and exhaust to the piston chambers in the manner above explained, will through the pawl combination produce oscillatory motion of the spindle 18 and any instrument that might be connected thereto for operation thereby.

This particular form of invention possesses numerous practical advantages. For instance, this mechanism is of comparatively simple form and decidedly less expensive than other such devices with respect to its construction, operation and maintenance, with less wear and consequently longer life of usefulness. Because of less wear between the parts, my mechanism is more accurate and dependable in its operation. Also, it will produce equal torque in both directions of movement. Furthermore, my mechanism is free of back-lash and radially outward thrust on the pistons and hence is positive in its action. Therefore the accurate and positive action of my present form of device is especially well adapted for use in connection with instruments of intricate and delicate nature. It is believed that other practical advantages will suggest themselves to those who are familiar with the art to which this invention relates.

It is to be understood that the present form of disclosure is merely for the sake of illustration and that there might be devised various modifications thereof without departing from the spirit of my invention as herein set forth and claimed.

What I claim is:

1. An actuator comprising a body having two parallel cylindrical chambers therein, a reciprocatable piston in each of said chambers, an oscillatable spindle mounted in said body midway between said chambers and with its axis of movement normal to the length of said chambers, said pistons being provided with duplicate rectangular recesses midway of the length thereof, said spindle having one end extending outward of said body for operative connection thereto and having its other end enclosed within said body and provided with diametrically located oscillatable rectangular pawls in co-operative engagement within said recesses, said body having end ports for attachment of fluid pressure and exhaust means thereto, one of said ports being connected with the chamber at one end of one of said pistons and with the chamber at the opposite end of the other of said pistons, the other of said ports being connected with the chamber at the other end of said first-named piston and with the chamber at the opposite end of said second-named piston.

2. An actuator comprising a body having two parallel cylindrical chambers therein, a reciprocatable piston in each of said chambers, an oscillatable spindle mounted in said body midway between said chambers and with its axis of movement normal to the length of said chambers, said pistons being provided with oppositely disposed rectangular recesses in the same plane with each other, said spindle having co-axially attached thereto a disk with diametrically located oscillatable rectangular pawls in co-operative engagement within said recesses, said body having end ports for attachment of fluid pressure and exhaust means thereto, one of said ports being connected with the chamber at one end of one of said pistons and with the chamber at the opposite end of the other of said pistons, the other of said ports being connected with the chamber at the other end of said first-named piston and with the chamber at the opposite end of said second-named piston.

3. An actuator comprising a body having two parallel cylindrical chambers therein, a reciprocatable piston in each of said chambers, an oscillatable spindle mounted in said body midway between said chambers and with its axis of movement normal to the length of said chambers, said pistons each being provided with a rectangular recess midway of the length thereof and in the same plane with each other, said spindle having one end extending outward from said body for operative connection thereto and having its other end enclosed within said body, said enclosed end of said spindle being provided with a disk in a plane normal to the axis of movement of said spindle and parallel with the plane of said recesses, said disk having diametrically located oscillatable rectangular pawls in co-operative engagement within said recesses, the transverse extent of said recesses being greater than that of said pawls so as to accommodate the combined movement of said pawls, said body having end ports for attachment of fluid pressure and exhaust means thereto, one of said ports having direct connections with the chamber at one end of one of said pistons and with the chamber at the opposite end of the other of said pistons, the other of said ports having direct connections with the chamber at the other end of said first-named piston and with the chamber at the opposite end of said second-named piston.

4. An actuator comprising a body having two parallel cylindrical chambers therein, reciprocatable pistons in said chambers, an oscillatable spindle mounted in said body between said chambers and with its axis of movement normal to the length of said chambers, said pistons each being provided with a transverse rectangular recess midway of the length thereof and in the same plane with each other, operative connections between said pistons and spindle for transmitting movement therebetween including diametrically located oscillatable rectangular pawls on said spindle and in co-operative engagement within said recesses, said body having ports for attachment of fluid pressure and exhaust means thereto, one of said ports having direct connection with one end of one of said chambers and with the opposite end of the other of said chambers, and the other of said ports having direct connections with the other ends of said chambers.

References Cited in the file of this patent

UNITED STATES PATENTS

| 2,543,686 | Brown | Feb. 27, 1951 |
| 2,844,127 | Steiner | July 22, 1958 |
| 2,848,056 | Herbenar | Aug. 19, 1958 |
| 2,878,058 | Gauthier et al. | Mar. 17, 1959 |
| 2,946,320 | Vogel | July 26, 1960 |

FOREIGN PATENTS

| 838,647 | Great Britain | June 22, 1960 |
| 839,153 | Great Britain | June 29, 1960 |